(12) United States Patent
Kortschack

(10) Patent No.: US 8,153,179 B2
(45) Date of Patent: Apr. 10, 2012

(54) PROCESS FOR THE SIMULTANEOUS SURFACE TREATMENT, PORTIONING AND SHAPING AS WELL AS PERSERVATION OF FOODSTUFFS SUCH AS MEAT AND SAUSAGE PRODUCTS, SAUSAGE MEAT OR THE LIKE

(75) Inventor: Fritz Kortschack, Berlin (DE)

(73) Assignee: Deutsches Institut fur Lebensmitteltechnik e.V., Quakenbruck (DE)

(*) Notice: Subject to any disclaimer, the term of this patent is extended or adjusted under 35 U.S.C. 154(b) by 861 days.

(21) Appl. No.: 11/578,446

(22) PCT Filed: Apr. 5, 2005

(86) PCT No.: PCT/EP2005/003571
§ 371 (c)(1), (2), (4) Date: Aug. 10, 2007

(87) PCT Pub. No.: WO2005/099465
PCT Pub. Date: Oct. 27, 2005

(65) Prior Publication Data
US 2008/0085348 A1    Apr. 10, 2008

(30) Foreign Application Priority Data
Apr. 16, 2004 (DE) .......................... 10 2004 018 595

(51) Int. Cl.
*A23B 4/005* (2006.01)
(52) U.S. Cl. .................. 426/513; 426/105; 426/521
(58) Field of Classification Search .................. 426/105, 426/513, 235, 412, 512, 521, 118, 129, 392, 426/399, 401, 404, 407, 414; 452/30, 31, 452/37, 39
See application file for complete search history.

(56) References Cited

U.S. PATENT DOCUMENTS

| | | | | |
|---|---|---|---|---|
| 2,685,518 A * | 8/1954 | Prohaska | .................. | 426/245 |
| 3,068,104 A * | 12/1962 | Gretler et al. | .................. | 426/245 |
| 3,190,759 A * | 6/1965 | Muller et al. | .................. | 426/412 |
| 3,327,622 A * | 6/1967 | Lebovitz | .................. | 425/408 |
| 3,421,434 A * | 1/1969 | Krachmer | .................. | 99/352 |
| 3,863,020 A | 1/1975 | Robinson | .................. | 426/513 |
| 4,997,663 A * | 3/1991 | Potthast | .................. | 426/241 |
| 5,472,725 A | 12/1995 | Mendenhall | .................. | 426/521 |
| 6,135,869 A * | 10/2000 | Schutz | .................. | 452/32 |
| 7,182,683 B2 * | 2/2007 | Shefet | .................. | 452/30 |

FOREIGN PATENT DOCUMENTS

| | | |
|---|---|---|
| DE | 19807794 | 11/1999 |
| DE | 19859830 | 6/2000 |
| DE | 10303274 | 7/2004 |

OTHER PUBLICATIONS

Fleischmagazin (Meat Magazine). Mar. 2004, pp. 26-30.

* cited by examiner

*Primary Examiner* — Rena Dye
*Assistant Examiner* — Steven Leff
(74) *Attorney, Agent, or Firm* — Gerald T. Bodner

(57) ABSTRACT

Process for the simultaneous surface treatment, apportioning and shaping, as well as conservation of foodstuffs such as meat and sausage products, sausage meat or the like, even without the use of skins or case-shaped or bag-shaped foils. The product is first compacted between two shaping, at least partially structured plates. At the end of the compacting process, the product is separated into shaping sections by being mechanically brought into contact with corresponding zones of the shaping plates. A natural skin having a reduced $a_w$ value, shape-stabilizing and sterilizing properties is formed on the product surface by appropriately and controllably heating the product, preferably by means of the shaping plates.

8 Claims, No Drawings

PROCESS FOR THE SIMULTANEOUS SURFACE TREATMENT, PORTIONING AND SHAPING AS WELL AS PERSERVATION OF FOODSTUFFS SUCH AS MEAT AND SAUSAGE PRODUCTS, SAUSAGE MEAT OR THE LIKE

The invention relates to a process for the simultaneous surface treatment, portioning and shaping as well as preservation of foodstuffs such as meat and sausage products, sausage meat or the like, also without the use of skins or envelope or bag-like foils.

A process for the production and shaping of foodstuffs such as meat and sausage products is previously known from DE 198 07 794 C2, according to which the foodstuffs are enveloped with foils prior to the final preservation, so as to be protected against a recontamination.

According to the above disclosure filled foils or foil bags, respectively, are aligned between plates which are provided with cavities. To achieve a uniform distribution of the product inside the foil bags the plates are first brought together. As of a specific plate distance or internal pressure of the bag the air between the foil and the cavity is sucked off through fine holes in the plate cavities so that the foil is expanded and pressed against the inner wall of the cavities. At the same time the sausage meat is completely forced into the cavities as a result of a further reduction of the plate distance so that the unformed foils lie on each other in a plane manner. If the final products are then to be removed from the packages individually, it is possible to seal the foil portions lying on each other in a plane manner through a fat or protein film.

For the intermediate storage the packed semi-finished products can then be deep-frozen, be heated immediately and cooled subsequently or treated with high pressure for the finishing thereof.

DE 103 03 274.6, which originates from the applicant and is not yet published, discloses a process for the surface treatment, the packing and preservation of foodstuffs such as meat or sausage products.

According to the object thereof the surface treatment is to be incorporated into the production process itself in a technologically optimized manner, with the aim to subject the then packed product to an optimal, uniformly distributed treatment, which is substantially limited to the surface, with substances that provide colors, flavors and odors.

To overcome the problem, the inner side of the bag or foil is, in a first embodiment, treated with a preferably heated mixture consisting of a treatment substance and a base material prior to filling in the semi-finished product, especially sausage meat. The mixture consisting of the treatment substance and the base material is made, for example, of substances that provide flavors, odors, and/or decoration substances as well as gelatin, fats, fat mixtures or the like.

In the actual step of preserving the semi-finished products by a thermal treatment the deposited mixture made of the treatment substance and the base material changes from a powdery, gel-like or nearly solid state into the liquid state so that a desired uniform distribution on the surface of the semi-finished product is obtained, which provides for appealing properties and an optimized surface structure. At room temperature and below the treatment mixture is preferably pasty to doughy-pasty and is made of a mixture combination which changes into the liquid state upon heating it.

For the treatment and the preservation according to the above-described teaching it is therefore imperative to treat the inner sides of the bags or foils with the mixture consisting of the treatment substance and the base material prior to filling in the semi-finished product, wherein the mixture consisting of the treatment substance and the base material then temporarily changes into the liquid state as a result of the thermal treatment, so that the desired uniform distribution on the surface of the semi-finished product is obtained.

For the production of sausage products having different geometric shapes it is known to fill sausage meat into skins and to then shape the filled skin manually to give it the desired shape. The sausage products are offered as fresh, non-scalded products and as pasteurized scalded products, unpacked or packed.

It is known from Fleischmagazin (meat magazine) March 2004, pages 26 to 30, to extrude a specific sausage meat shape without skin onto a conveyor belt by means of a computer-controlled movement of filling nozzles. The extruded sausage meat is then subjected to a thermal treatment to preserve it and to solidify the product.

It is known that non-scalded products have the advantage that they also have an optically fresh appearance. During the production process ingredients get lost due to the scalding process. Scalded products have a significantly longer keeping quality as a result of the heating process, however, there is a considerable product shrinkage during the scalding process, which is due to the loss of liquid, protein and other ingredients, especially with products made without a skin. The cooling process taking place after the heating process, as a rule with cooling water, encourages the recontamination of the sausage surface, so that the keeping quality is strongly reduced because of the increasing $a_w$-value on the surface of the products.

Non-scalded products are usually offered in a natural skin. These natural skins are watered prior to their use and are, therefore, also a good culture medium for undesired germs, which is a drawback for the keeping quality of such products.

It therefore is the object of the invention to provide a further developed process for the simultaneous surface treatment, portioning and shaping as well as preservation of foodstuffs such as meat and sausage products, sausage meat or the like, which gets along without the use of skins or envelopes or bag-like foils, respectively, and which does not show any drawbacks if such enveloping materials are possibly used, wherein the shaping is to be reproducible and the danger of contamination or recontamination can be reduced in terms of an optimized keeping quality.

The object of the invention is achieved with a process as defined according to the teaching of patent claim 1, with the dependent claims representing at least useful embodiments and advancements.

Accordingly, in the process for the simultaneous surface treatment, portioning and shaping as well as preservation of foodstuffs such as meat and sausage products, sausage meat or the like, the product is first compacted between two shaping, at least partially structured plates. During the compaction the product is separated into shaped sections by mechanically contacting corresponding portions or parts of the shaping plates, which more or less act as a cutting or separating device.

Afterwards, or already during the compacting process, an appropriate controlled heating of the product is performed, preferably by the shaping plates themselves, to form a natural skin having a reduced $a_w$-value on the surface of the product, which results both in a product shape stabilization and a sterilizing effect.

During a very carefully dosed heating for a short time only a thin natural skin having a reduced $a_w$-value is formed, which appears transparent again after the cooling, so that altogether the optical effect of an almost fresh product is obtained.

A stronger heating with a more intensive thermal influence for a longer time allows the formation of a surface layer which corresponds to a pre-grilled or pre-baked product.

Thus, by simply changing the process parameters, a product can be produced which satisfies the different customers' needs.

If envelopes, especially skins, are used, the thermal influence not only allows the formation of the stabilizing natural skin, but also a sterilization of the enveloping or skin material.

With the shaping a reproducible end sizing of sausages or the like products is achieved, wherein the final shape is maintained due to the stabilizing natural skin when the products are removed from the shaping plates.

The heat acting on a possibly provided enveloping or skin material withdraws the moisture from the same and an advantageous drying process takes place.

To prevent the enveloping material from bonding or sticking together, the shaping plates are provided with a thermal insulation or an appropriate cooling in the region of the separating sections.

The invention will be explained in more detail below by means of an exemplary embodiment and further embodiments.

According to one embodiment of the invention the sausage meat is compacted between two plates, whereof at least one or also both, laterally reversed to each other, have the desired geometric dimensions, such that the recesses or elevations, respectively, in the molds cause a separation of the sausage meat at the end of the compacting step. Then, if the surface of the possibly coated quasi punch molds is heated, or if already heated punches are used, the protein on the surface of the product to be treated coagulates and a natural skin is formed which, in the course of the ongoing production process, stops the sausage meat of the separated semi-finished product from rejoining.

By this it is achieved that the coagulation layer has a significantly reduced $a_w$-value, so that only a small number of germs can settle on this relatively dry surface, as compared to a moist or wet surface.

With a finely dosed surface heating fresh products produced in this manner cannot be distinguished from products that were filled into a skin. The surface of an only thinly coagulated protein layer surprisingly turns transparent or translucent again after the treatment. Such products can be sold both unpacked and as an SB-product.

For the production of already pre-grilled sausage products or baked products, e.g. a meat loaf intended for baking, an intensified heat irradiation according to one embodiment of the invention provides for such a surface of the semi-finished products that their outer appearance is comparable with an actually grilled sausage or, respectively, a baked meat loaf.

In correspondence with known production process for scalded skin products the skinless semi-finished products can also be scalded and then be marketed as unpacked goods or also in an SB-package.

Moreover, it is advantageous that the natural skin formed as a result of the controlled heating is able to seal or close disturbing holes, for example, in the skin or in an enveloping material, which results in an increased product quality, especially in a next food preparation process taking place later.

For the production of the aforementioned SB-package the semi-finished products need not be scalded in advance. For the surface formation, or for providing flavor, the semi-finished product coagulated on the surface can be smoked or surface-treated. With regard to the surface treatment reference is made to the disclosure according to DE 103 03 274.6, in order to avoid repetitions.

Also a pasteurization is possible, whereby the separation of the individual semi-finished products during the heating process can be waived as the already coagulated surface of the semi-finished product effectively prevents the individual semi-finished products from sticking together again.

The pasteurization of products in the skin regularly results in undesired shaping variations, e.g. strong curvatures, convolutions etc., which reduce the market value of the produced product. By a thermal treatment of the semi-finished products in the fixed state according to the invention it is achieved that the protein of the skin and the sausage meat layer underneath coagulates to a small extent so that the shape now obtained no longer changes, even later during the pasteurization in the vacuum packaging. The coagulation layers of the skin and the sausage meat prevent the sausage meat from escaping out of the sausage ends in an undesired manner during the vacuum treatment.

One essential criterion in the production of scalded sausages in the skin is the continuous parchment-type drying of the skin so that the skin is not tough when eating the sausage later. By applying the invention this requirement is satisfied by contacting the skin with hot surfaces of the shaping plates, whereby the water is driven out of the outer layer of the semi-finished product, the skin and the sausage meat layer directly underneath thereof by means of the thermal influence. The skin dried in this manner is no longer able to reabsorb water as the proteins have coagulated as a result of the thermal influence. As was mentioned above, a surface treatment, e.g. with liquid smoke, and a subsequent pasteurization may take place to finish the product.

According to another embodiment of the invention it is possible to produce an SB-package with individual slices, such as of meat loaf or also cold cuts, provided that the protein on the surfaces lying on each other have coagulated. This required treatment can be performed with thermal radiation, but also with thermal contact.

During the cutting process with a knife, especially an ultrasound knife, the coagulating effect of which is increased by heating the knife, thin slices of sausages can also be pasteurized after the packing, whereby the individual sausage slices do not reenter into a permanent connection after the production process.

According to another embodiment of the inventive process a shaping punch subdivides a bag filled with sausage meat into predefined partial segments, cords or any optional shapes, i.e. worms or pretzels, such that the heated punch not only renders the foil plastic and deforms it in accordance with the intended shape, but the surface of the shaped sausage meat is solidified by the protein coagulation so that the achieved separation is no longer reversible also by the subsequent thermal treatment. In this case, the heating is therefore performed to an extent that the desired coagulation takes place.

As the individual cords or pieces of the sausage meat no longer rejoin, a sealing seam between the sausage meat cords or segments may be waived. Therefore, after the termination of the treatment, an SB-package ready for sale is available. This approach moreover prevents that the otherwise occurring change of state of the typically foil-like enveloping material releases undesired substances during the sealing.

The invention claimed is:

1. A process for the simultaneous surface treatment, portioning and shaping as well as preservation of food product, such as meat and sausage products, and sausage meat, comprising the following steps:

compacting the product between two shaping, at least partially structured plates laterally reversed to each other, at least one of the plates being movable towards the other plate, the product being disposed between the plates and compacted thereby;

separating the product into shaped sections simultaneously during the compaction by mechanically contacting corresponding portions of the shaping plates;

controllably heating the product by the shaping plates simultaneously with compacting and separating the product to form a thin natural skin layer on the surface of the product which has a reduced $a_w$-value and both product shape stabilizing and sterilizing properties; and cooling the product, whereby the thin natural skin layer becomes transparent or translucent.

2. A process according to claim 1,
characterized in that
the food product does not include an enveloping material prior to the step of compacting the product.

3. A process according to claim 1,
characterized in that
the food product includes an enveloping material prior to the step of compacting the product.

4. A process according to claim 3,
characterized in that
the step of controllably heating the product simultaneously sterilizes the enveloping material.

5. A process according to claim 1,
characterized in that
the step of separating the product into shaped sections allows a reproducible end sizing of the food product, wherein the final shape of the food product is maintained due to the thin natural skin layer which is formed.

6. A process according to claim 4,
characterized in that
the step of controllably heating the product includes the step of drying the product whereby moisture is withdrawn from the enveloping material.

7. A process according to claim 4, wherein the shaped sections of food product formed by the step of separating the product into shaped sections include adjacent end portions of the shaped sections, and wherein the process is
characterized in that
the step of controllably heating the product includes one of the steps of 1) cooling the shaping plates in regions of the shaping plates which are in proximity to the adjacent end portions of the shaped sections and 2) insulating the shaping plates in regions of the shaping plates which are in proximity to the adjacent end portions of the shaped sections, to prevent the enveloping material from bonding or sticking together.

8. A process according to claim 6, wherein the shaped sections of food product formed by the step of separating the product into shaped sections include adjacent end portions of the shaped sections, and wherein the process is
characterized in that
the step of controllably heating the product includes one of the steps of 1) cooling the shaping plates in regions of the shaping plates which are in proximity to the adjacent end portions of the shaped sections and 2) insulating the shaping plates in regions of shaping plates which are in proximity to the adjacent end portions of the shaped sections, to prevent the enveloping material from bonding or sticking together.

\* \* \* \* \*